July 31, 1923.
C. R. KOSITZKY
1,463,425
AUTOMOBILE TURNING SIGNAL
Filed March 12, 1923
2 Sheets-Sheet 1
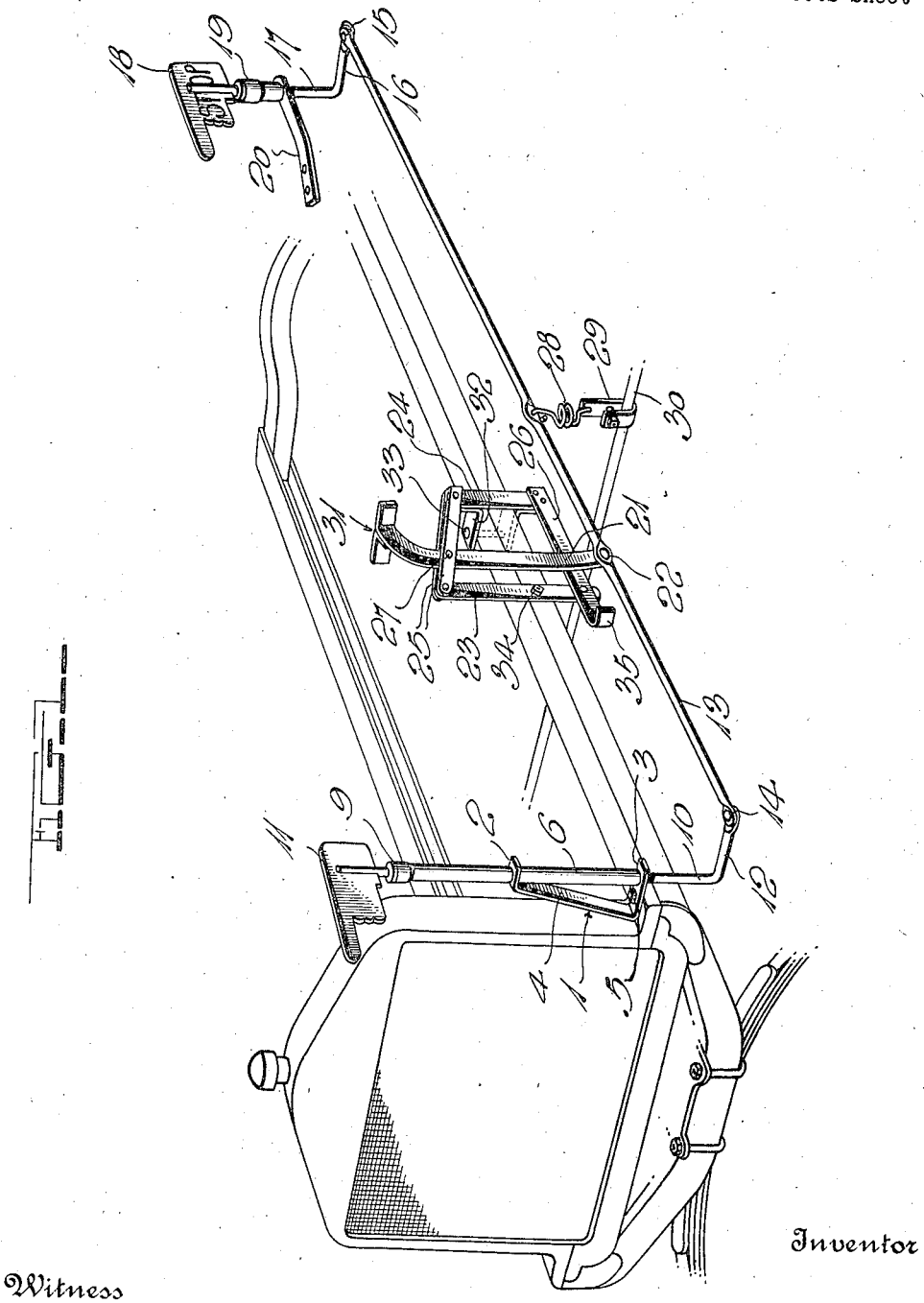
Witness
H. Woodard
Inventor
C. R. Kositzky
By H. B. Willson &Co
Attorneys July 31, 1923.
C. R. KOSITZKY
1,463,425
AUTOMOBILE TURNING SIGNAL
Filed March 12, 1923
2 Sheets-Sheet 2
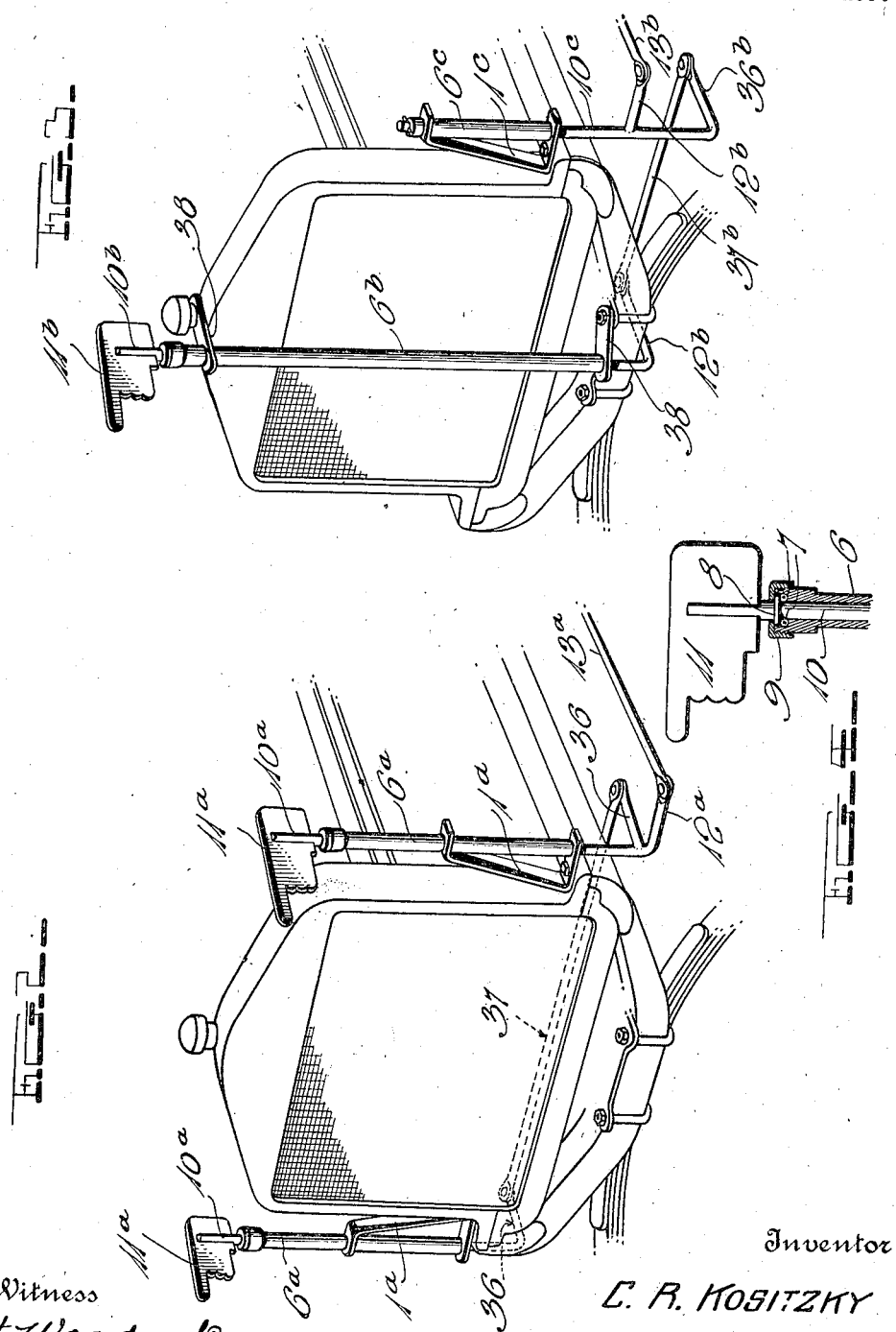
Witness
H. Woodard
Inventor
C. R. KOSITZKY
By H. B. Wilson &co
Attorneys Patented July 31, 1923.

1,463,425

UNITED STATES PATENT OFFICE.

CARL REINHOLDT KOSITZKY, OF BISMARCK, NORTH DAKOTA.

AUTOMOBILE TURNING SIGNAL.

Application filed March 12, 1923. Serial No. 624,569.

*To all whom it may concern:*

Be it known that I, CARL R. KOSITZKY, a citizen of the United States, residing at Bismarck, in the county of Burleigh and State of North Dakota, have invented certain new and useful Improvements in Automobile Turning Signals; and I do declare the following to be a full, clear, and exact description of the invention, such as will enable others skilled in the art to which it appertains to make and use the same.

My invention has for its object to provide a simple and inexpensive, easily operable and efficient turning signal for automobiles which may be operated before a turn is made to show the direction to be taken by the machine.

In carrying out the above end, further aims are to provide unique means for operating the signal or signals and holding all parts against rattling, and to provide a novel form of support which may be used for mounting a vertical signal shaft at any desired point.

With the foregoing in view, the invention resides in the novel subject matter hereinafter described and claimed, the description being supplemented by the accompanying drawing.

Figure 1 is a perspective view of a portion of an automobile chassis showing the application of one form of my invention thereto.

Figures 2 and 3 are perspective views showing slightly different forms of construction.

Figure 4 is a detail sectional view showing the ball-bearings which are preferably used in connection with each vertical signal shaft.

In Fig. 1 of the drawings, the numeral 1 designates a C-shaped attaching bracket bent from a single metal bar and comprising a relatively short upper arm 2, a longer lower arm 3, and an inclined connecting or brace portion 4 extending between the two arms. The lower arm 3 is formed with a bolt hole to receive an attaching bolt by means of which the bracket 1 may be secured to the chassis frame of an automobile. The arms 2 and 3 are formed with vertically alined openings in which an upright tubular bearing member 6 is secured, the upper end of said bearing member being preferably provided with a ball race receiving ball-bearings 7 upon which a cone or the like 8 is held by a screw-cap 9, said cone being carried by an upright signal shaft 10. The upper end of this shaft carries a suitable direction indicator 11 while the lower end of said shaft is bent laterally to provide a crank arm 12.

A longitudinal rod 13 has its front end pivoted at 14 to the crank arm 12, while the rear end of said rod 13 is pivoted at 15 to a lateral crank arm 16 on a vertical signal shaft 17 whose upper end is provided with a direction indicator and stop sign 18. A suitable bearing 19 and attaching bracket 20 are provided for mounting the shaft 17 and associated parts at the rear end of the chassis frame.

Means are provided for longitudinally moving the rod 13 in either direction, whereby the direction signals 11 may be simultaneously turned to indicate that the machine will turn to the right or left, as may be necessary. Regardless of the direction in which the signal 18 is turned, it preferably displays the word "Stop" (printed on both sides) so as to give a warning to other vehicles which may be approaching from the rear.

In the preferred form of construction, a vertical foot lever 21 has its lower end pivoted to the rod 13 as indicated at 22, an appropriate carrying frame being provided for said lever. This frame preferably consists of a front relatively long vertical bar 23, a rear shorter vertical bar 24, a pair of forwardly inclined bars 25 extending between the upper ends of said bars 23 and 24 and secured thereto, and a horizontal lower bar 26. The lever 21 passes between the bars 25 and is fulcrumed thereto as indicated at 27, said bars being secured to opposite sides of the bars 23 and 24, so that the upper end of said lever is in the same plane with said last named bars. The lower end of the lever 21 is laterally sprung and engages the outer side of the bar 26 and it will thus be seen that the inherent resiliency of said lever will hold it against rattling. Rattling of the rod 13 and associated parts is prevented by a coiled spring 28 engaged at its upper end with said rod and having at its lower end a suitable clip or the like 29 whereby it may be attached to a suitable part of the chassis frame, for instance to one of the usual transverse brace rods 30. The spring 28 pulls constantly down upon the rod 13 and it will be seen that when the lever 21 is operated to move said rod in either direction, the spring 28 will be further stretched. Thus, the tension of this spring will be exerted to return all parts to neutral positions, when the lever is released.

The upper end of the foot lever 21 is suitably shaped to form a foot plate 31 and said upper end is preferably curved rearwardly to some extent as shown, permitting more convenient operation. This curved end of the lever extends through the inclined floor boards at the front of the automobile body and the carrying frame for the lever 21 is located beneath these boards and is suitably secured to one of the side bars of the chassis frame. In the construction shown, a pair of horizontal arms 32 extend inwardly from the bar 24 to straddle the chassis frame side bar, said arms 32 being clamped against the bar by a bolt 33. The bar 23 may well be secured to the chassis bar by a bolt 34 slightly longer than a bolt which now passes through said chassis bar at the required point, on certain makes of machines.

When the foot plate 31 is depressed against the floor boards, the direction indicators 11 and 18 will turn the proper distance to indicate a left hand turn. It is necessary to pull rearwardly upon the plate 31 with the foot, however, to indicate a right hand turn. For the purpose of limiting this movement of the lever 21, the front end of the bar 26 is by preference bent laterally outward at 35 to be struck by the lower end of said lever.

In the construction shown in Fig. 2, a pair of direction indicators 11$^a$ are mounted at the front end of the chassis and are carried by vertical shafts 10$^a$ mounted in tubular bearings 6$^a$ carried by brackets 1$^a$, the construction of these parts being the same as that above described. The lower ends of the shafts 10$^a$ are provided with rearwardly extending crank arms 36 pivoted to the ends of a transverse connecting rod 37 so that the two signal shafts and indicators 11$^a$ will move in unison. The lower end of one of these shafts is also provided with a crank arm 12$^a$ pivoted to a longitudinal rod 13$^a$ which may be considered as a duplicate of and operating in exactly the same manner as the rod 13 above described.

In the construction shown in Fig. 3, a single tubular bearing 6$^b$ is provided at the center of the automobile radiator, for supporting a vertical signal shaft 10$^b$ having a direction indicator 11$^b$ at its upper end and a rearwardly extending crank arm 12$^b$ at its lower end. Suitable supports 38 are provided for the bearings 16 and they may well be connected to the radiator neck and front end of the chassis frame as shown.

The crank arm 12$^b$ is connected by a rod 37$^b$ to a crank arm 36$^b$ on a vertical signal operating shaft 10$^c$, this shaft being provided with a lateral crank arm 12$^b$ pivoted to a longitudinal operating rod 13$^b$ which is a duplicate of and operated in the same manner as the rods 13 and 13$^a$ above described.

For rotatably mounting the shaft 10$^c$, I provide a tubular bearing 6$^c$ carried by a bracket 1$^c$.

From the above, it will be seen that I have provided a signal which will be very desirable and may be easily operated to show in what direction a turn is to be made. The turning signals are visible at both the front and rear of the machine in the present disclosure, and the rear signal, in addition to showing in which direction the machine will turn, warns approaching vehicles to stop or decrease their speed, thereby lessening the element of danger.

As excellent results may be obtained from the details disclosed, these details may be followed if desired. However, within the scope of the invention as claimed, numerous minor changes may be made.

I claim:

1. A turning signal for automobiles comprising upright signal operating shafts and means for mounting them at the front and rear of a machine respectively, each of said shafts having a lateral crank arm, a longitudinal rod extending between and pivoted at its ends to said crank arms, and means connected to said rod for moving the same either forwardly or rearwardly to turn said shafts simultaneously in one direction or the other, and a yieldable connection between said rod and a fixed part of the chassis to normally retain the lever in a neutral position and prevent rattling.

2. A turning signal for automobiles comprising upright signal operating shafts and means for mounting them at the front and rear of a machine respectively, each of said shafts having a lateral crank arm, a longitudinal rod extending between and pivoted at its ends to said crank arms, a longitudinally swinging lever pivoted at its lower end to said rod for moving the latter forwardly or rearwardly, means for mounting said lever on the frame of the machine, a coiled spring connected with and depending from said rod between the ends of the latter, and means on the lower end of said spring for attaching the same under tension to a fixed part of the chassis, whereby to hold said lever in a neutral position and to prevent rattling.

3. Automobile signal operating means comprising a frame disposed in a vertical plane and means for securing it to the frame of an automobile, said frame including a horizontal bar at its lower end, and a vertical foot lever fulcrumed to the upper end of said frame, the lower end of said lever being laterally sprung and slidably engaging said horizontal bar to hold said lever yieldably against rattling.

In testimony whereof I have hereunto affixed my signature.

CARL REINHOLDT KOSITZKY.